US010592575B2

(12) United States Patent
Barve et al.

(10) Patent No.: US 10,592,575 B2
(45) Date of Patent: *Mar. 17, 2020

(54) METHOD OF AND SYSTEM FOR INFERRING USER INTENT IN SEARCH INPUT IN A CONVERSATIONAL INTERACTION SYSTEM

(71) Applicant: Veveo, Inc., Andover, MA (US)

(72) Inventors: Rakesh Barve, Bangalore (IN); Murali Aravamudan, Andover, MA (US); Sashikumar Venkataraman, Andover, MA (US); Girish Welling, Nashua, NH (US)

(73) Assignee: VEVEO, INC., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/228,847

(22) Filed: Aug. 4, 2016

(65) Prior Publication Data

US 2016/0342702 A1 Nov. 24, 2016

Related U.S. Application Data

(63) Continuation of application No. 13/667,400, filed on Nov. 2, 2012, now Pat. No. 9,424,233.

(Continued)

(51) Int. Cl.
*G06F 7/00* (2006.01)
*G06F 16/955* (2019.01)
(Continued)

(52) U.S. Cl.
CPC ...... *G06F 16/9558* (2019.01); *G06F 16/2457* (2019.01); *G06F 16/24573* (2019.01);
(Continued)

(58) Field of Classification Search
CPC ......... G06F 17/30882; G06F 17/30914; G06F 17/30525; G06F 17/278; G06F 17/27;
(Continued)

(56) References Cited

U.S. PATENT DOCUMENTS 4,509,133 A 4/1985 Monbaron
5,748,841 A * 5/1998 Morin ....................... G06F 3/16
704/257

(Continued)

FOREIGN PATENT DOCUMENTS

JP H06266779 9/1994
JP H09146972 6/1997
(Continued)

OTHER PUBLICATIONS

Kumar et al., "Reference resolution as a facilitating process towards robust multimodal dialogue management: A cognitive grammar approach," International Symposium on Reference Resolution and its Application to Question Answering and Summarization, Jan. 1, 2003 (8 pages).

(Continued)

*Primary Examiner* — Mohammed R Uddin
(74) *Attorney, Agent, or Firm* — Haley Guiliano LLP

(57) ABSTRACT

A method of inferring user intent in search input in a conversational interaction system is disclosed. A method of inferring user intent in a search input includes providing a user preference signature that describes preferences of the user, receiving search input from the user intended by the user to identify at least one desired item, and determining that a portion of the search input contains an ambiguous identifier. The ambiguous identifier is intended by the user to identify, at least in part, a desired item. The method further includes inferring a meaning for the ambiguous identifier based on matching portions of the search input to the (Continued)

preferences of the user described by the user preference signature and selecting items from a set of content items based on comparing the search input and the inferred meaning of the ambiguous identifier with metadata associated with the content items.

20 Claims, 12 Drawing Sheets

Related U.S. Application Data

(60) Provisional application No. 61/712,721, filed on Oct. 11, 2012, provisional application No. 61/673,867, filed on Jul. 20, 2012.

(51) Int. Cl.
*G06F 16/84* (2019.01)
*G06F 16/2457* (2019.01)
*G06F 17/27* (2006.01)
*G06F 17/28* (2006.01)
*G06F 17/21* (2006.01)

(52) U.S. Cl.
CPC .............. *G06F 16/84* (2019.01); *G06F 17/21* (2013.01); *G06F 17/27* (2013.01); *G06F 17/278* (2013.01); *G06F 17/2785* (2013.01); *G06F 17/28* (2013.01)

(58) Field of Classification Search
CPC ...... G06F 17/28; G06F 17/21; G06F 17/2785; G06F 17/30522
USPC .......................... 707/708, 733, 734, 771, 780
See application file for complete search history.

(56) References Cited

U.S. PATENT DOCUMENTS

| | | | |
|---|---|---|---|
| 5,802,504 A * | 9/1998 | Suda ........................ G06F 17/24 706/11 |
| 6,035,267 A | 3/2000 | Watanabe |
| 6,408,293 B1 | 6/2002 | Aggarwal et al. |
| 7,092,928 B1 * | 8/2006 | Elad ..................... G06F 17/3089 704/260 |
| 7,340,460 B1 * | 3/2008 | Kapur ................ G06F 17/30696 |
| 7,856,441 B1 * | 12/2010 | Kraft ................... G06F 17/3064 707/758 |
| 7,937,272 B2 | 5/2011 | Oomen |
| 8,073,681 B2 * | 12/2011 | Baldwin ................. G10L 15/22 704/270 |
| 8,156,129 B2 | 4/2012 | Zhou |
| 8,346,563 B1 * | 1/2013 | Hjelm ................. G10L 15/1822 379/88.01 |
| 8,903,793 B2 | 12/2014 | Bangalore |
| 8,954,318 B2 | 2/2015 | Barve et al. |
| 9,009,046 B1 * | 4/2015 | Stewart ................... G10L 15/18 704/251 |
| 9,183,183 B2 | 11/2015 | Barve et al. |
| 9,251,225 B2 | 2/2016 | Stanfill |
| 9,318,108 B2 * | 4/2016 | Gruber ................. G10L 15/1815 |
| 9,424,233 B2 | 8/2016 | Barve et al. |
| 9,465,833 B2 | 10/2016 | Aravamudan et al. |
| 9,477,643 B2 | 10/2016 | Barve et al. |
| 9,542,482 B1 | 1/2017 | Sachan |
| 10,341,447 B2 | 7/2019 | Kelly |
| 2003/0101047 A1 | 5/2003 | Panttaja |
| 2003/0101286 A1 * | 5/2003 | Kolluri ............. G06F 17/30882 719/316 |
| 2003/0216912 A1 | 11/2003 | Chino |
| 2004/0215443 A1 * | 10/2004 | Hatton ................ G06F 17/2785 704/1 |
| 2005/0055321 A1 | 3/2005 | Fratkina |
| 2006/0074870 A1 | 4/2006 | Brill et al. |
| 2007/0011154 A1 * | 1/2007 | Musgrove ........... G06F 17/2785 |
| 2007/0043574 A1 | 2/2007 | Coffman |
| 2007/0043736 A1 * | 2/2007 | Jain .................... G06F 17/30864 |
| 2007/0073540 A1 | 3/2007 | Hirakawa |
| 2007/0083359 A1 * | 4/2007 | Bender ............... G06F 17/2785 704/9 |
| 2007/0100618 A1 * | 5/2007 | Lee ..................... G10L 15/1822 704/238 |
| 2007/0192101 A1 | 8/2007 | Braho |
| 2007/0250468 A1 * | 10/2007 | Pieper ............... G06F 17/30867 |
| 2007/0271205 A1 * | 11/2007 | Aravamudan .... G06F 17/30035 706/12 |
| 2008/0091406 A1 * | 4/2008 | Baldwin ................. G10L 15/22 704/4 |
| 2008/0104032 A1 * | 5/2008 | Sarkar ................. G06F 17/3089 |
| 2008/0120072 A1 | 5/2008 | Bartz |
| 2008/0120093 A1 | 5/2008 | Izumida |
| 2008/0147655 A1 * | 6/2008 | Sinha ................ G06F 17/30864 |
| 2008/0155701 A1 | 6/2008 | Marinez |
| 2008/0228496 A1 * | 9/2008 | Yu .......................... G06F 3/038 704/275 |
| 2009/0058860 A1 * | 3/2009 | Fong ...................... G06F 17/211 345/467 |
| 2009/0254539 A1 * | 10/2009 | Wen .................. G06F 17/30247 |
| 2009/0265331 A1 * | 10/2009 | Chandrasekar ... G06F 17/30867 |
| 2010/0070448 A1 * | 3/2010 | Omoigui ............. H01L 27/1463 706/47 |
| 2010/0114944 A1 * | 5/2010 | Adler ..................... G10L 13/027 707/770 |
| 2010/0153428 A1 * | 6/2010 | Schechter ......... G06F 17/30867 707/768 |
| 2010/0153885 A1 | 6/2010 | Yates |
| 2011/0295688 A1 * | 12/2011 | Shen .................. G06Q 30/0241 705/14.54 |
| 2012/0016678 A1 * | 1/2012 | Gruber ................ G06F 17/3087 704/275 |
| 2012/0059713 A1 * | 3/2012 | Galas ................. G06Q 30/0244 705/14.49 |
| 2012/0124071 A1 | 5/2012 | Gebhard |
| 2012/0158703 A1 * | 6/2012 | Li ..................... G06F 17/30693 707/723 |
| 2014/0214401 A1 | 7/2014 | Li |
| 2014/0337370 A1 | 11/2014 | Aravamudan |
| 2014/0337381 A1 | 11/2014 | Aravamudan |
| 2016/0179801 A1 | 6/2016 | Venkataraman |
| 2016/0226984 A1 | 8/2016 | Christensen |
| 2016/0227283 A1 | 8/2016 | Christensen |
| 2017/0004184 A1 | 1/2017 | Jain |
| 2017/0017719 A1 | 1/2017 | Aravamudan |
| 2018/0139298 A1 | 5/2018 | Kelly |
| 2018/0260445 A1 | 9/2018 | Aravamudan |
| 2018/0349755 A1 | 12/2018 | Gao |
| 2019/0051317 A1 | 2/2019 | Aravamudan |

FOREIGN PATENT DOCUMENTS

| | | |
|---|---|---|
| JP | 2001-034292 | 2/2001 |
| JP | 2001043246 | 2/2001 |
| JP | 2001-100787 | 4/2001 |
| JP | 2001-175680 | 6/2001 |
| JP | 2003-058538 | 2/2003 |
| JP | 2006-107469 | 4/2006 |
| JP | 2006-172280 | 6/2006 |
| JP | 2008-243047 | 10/2008 |
| JP | 2009-037603 | 2/2009 |
| JP | 2010-205265 | 9/2010 |
| WO | WO 1998/013771 | 4/1998 |
| WO | WO 2007/103938 | 9/2007 |

(56) References Cited

FOREIGN PATENT DOCUMENTS

| WO | WO2011088053 | 7/2011 |
|----|--------------|--------|
| WO | WO-2002073331 | 9/2012 |

OTHER PUBLICATIONS

U.S. Appl. No. 14/071,168, filed Nov. 4, 2013, Non-Final Office Action dated Jun. 10, 2016.

* cited by examiner

100

IMDb | Find Movies, TV shows, Celebrities and more... | All | 🔍
Movies ▾ | TV ▾ | News ▾ | Trailers ▾ | Comm...

All
Titles
TV Episodes
Names
Companies
Keywords
Characters
Videos
Quotes
Bios
Plots
Advanced Search >>

~105

Advanced Search

Welcome to Advanced Search, which gives you instant access to our 1,633,300 titles and 3,649,234 names.

Advanced Title Search

Want to get a list of comedies from the 1970s that have at least 1000 votes and an average rating of 7.5 or higher? Use Advanced Title Search.

Advanced Name Search

Want a list of males in the database who are Virgos and over 6 feet tall? Use Advanced Name Search.

Collaborations and Overlaps

Want a list of titles in which both Brad Pitt and George Clooney appeared? Or a list of people who worked on both Forrest Gump and Apollo 13? Try searching Collaborations and Overlaps.

Browse/Search Videos

If you'd like to browse our full list of available content, you can look at our Browse Videos page. Alternately, you can search our video catalog at Search Videos and narrow down your results using the facets on the right hand side of the page.

Title Text Search

Please select a section to search within (plot summary, quotes, trivia, etc) and enter a word to search for (e.g. "horses").

Plot ▾ | | Submit

Plot
Trivia
Quotes          earch
Goofs           tion to search within (mini biography, trivia, quotes) and enter a word to
Crazy Credits   ested").
Filming Locations
Soundtracks           | Submit
Literature
Versions

200 e.g. The Godfather

Title Type

☐ Feature Film ☐ TV Movie ☐ TV Series ☐ TV Episode
☐ TV Special ☐ Mini-Series ☐ Documentary ☐ Video Game
☐ Short Film ☐ Video ☐ Unknown Work

Release Date ⑦

☐ to ☐
Format: YYYY-MM-DD, YYYY-MM, or YYYY

User Rating

[-] to [-]

Number of Votes ⑦

☐ to ☐

Genres

☐ Action ☐ Adventure ☐ Animation ☐ Biography
☐ Comedy ☐ Crime ☐ Documentary ☐ Drama
☐ Family ☐ Fantasy ☐ Film-Noir ☐ Game-Show
☐ History ☐ Horror ☐ Music ☐ Musical
☐ Mystery ☐ News ☐ Reality-TV ☐ Romance
☐ Sci-Fi ☐ Sport ☐ Talk-Show ☐ Thriller
☐ War ☐ Western

Title Groups

☐ Oscar-Winning ☐ Best Picture-Winning ☐ Best Director-Winning
☐ Oscar-Nominated ☐ Emmy Award-Winning ☐ Emmy Award-Nominated
☐ Golden Globe-Winning ☐ Golden Globe-Nominated ☐ Razzie-Winning
☐ Razzie-Nominated ☐ National Film Board Preserved ☐ IMDb "Top 100"
☐ IMDb "Top 250" ☐ IMDb "Top 1000" ☐ IMDb "Bottom 100"
☐ IMDb "Bottom 250" ☐ IMDb "Bottom 1000" ☐ Now-Playing

Title Data ⑦

Alternate Versions
Awards
Blu-ray at Amazon.ca
Blu-ray at Amazon.com

Common Cast / Crew Between Two Titles

To find a list of people who worked together on two titles, start typing the first title and select it from the drop-down. Then, advance to the second box and follow the same steps. Once you have your two titles selected, click the search button to continue.

[🔍                                    ]

[🔍                                    ]

[ Search ]

Two People Working Together

To begin, start typing one person's name in the first box and select the name from the drop-down list of possible matches. Then, advance to the second box and follow the same steps. Once you have your two names selected, click the search button to continue.

[🔍                                    ]

[🔍                                    ]

[ Search ]

FIG. 5

METHOD OF AND SYSTEM FOR INFERRING USER INTENT IN SEARCH INPUT IN A CONVERSATIONAL INTERACTION SYSTEM

CROSS-REFERENCE TO RELATED APPLICATIONS

This application is a continuation of U.S. patent application Ser. No. 13/667,400, filed Nov. 2, 2012 (allowed), which claims the benefit under 35 U.S.C. § 119(e) to U.S. Provisional Patent Application No. 61/673,867 entitled A Conversational Interaction System for Large Corpus Information Retrieval, filed on Jul. 20, 2012, and U.S. Provisional Patent Application No. 61/712,721 entitled Method of and System for Content Search Based on Conceptual Language Clustering, filed on Oct. 11, 2012, the contents of each of which are incorporated by reference herein.

BACKGROUND OF THE INVENTION

Field of Invention

The invention generally relates to conversational interaction techniques, and, more specifically, to inferring user input intent based on resolving input ambiguities and/or inferring a change in conversational session has occurred.

Description of Related Art

Conversational systems are poised to become a preferred mode of navigating large information repositories across a range of devices: Smartphones, Tablets, TVs/STBs, multi-modal devices such as wearable computing devices such as "Goggles" (Google's sunglasses), hybrid gesture recognition/speech recognition systems like Xbox/Kinect, automobile information systems, and generic home entertainment systems. The era of touch based interfaces being center stage, as the primary mode of interaction, is perhaps slowly coming to an end, where in many daily life use cases, user would rather speak his intent, and the system understands and executes on the intent. This has also been triggered by the significant hardware, software and algorithmic advances making text to speech significantly effective compared to a few years ago.

While progress is being made towards pure conversation interfaces, existing simple request response style conversational systems suffice only to addresses specific task oriented or specific information retrieval problems in small sized information repositories—these systems fail to perform well on large corpus information repositories.

Current systems that are essentially request response systems at their core, attempt to offer a conversational style interface such as responding to users question, as follows:
User: What is my checking account balance?
System: It is $2,459.34.
User: And savings?
System: It is $6,209.012.
User: How about the money market?
System: it is $14,599.33.

These are inherently goal oriented or task oriented request response systems providing a notion of continuity of conversation though each request response pair is independent of the other and the only context maintained is the simple context that is user's bank account. Other examples of current conversational systems are ones that walk user through a sequence of welt-defined and often predetermined decision tree paths, to complete user intent (such as making a dinner reservation, booking a flight etc.).

Applicants have discovered that understanding user intended within a domain such as digital entertainment where user intent could span from pure information retrieval, to watching a show, or reserving a ticket for a show/movie), combined with understanding the semantics of the user utterance expressing the intent, so as to provide a clear and succinct response matching user intent is a hard problem that present systems in the conversation space fall short in addressing. Barring simple sentences with clear expression of intent, it is often hard to extract intent and the semantics of the sentence that expresses the intent, even in a single request/response exchange style interaction. Adding to this complexity, are intents that are task oriented without having well defined steps such as the traversal of a predetermined decision tree). Also problematic are interactions that require a series of user requests and system responses to get to the completion of a task (e.g., like making a dinner reservation). Further still, rich information repositories can be especially challenging because user intent expression for an entity may take many valid and natural forms, and the same lexical tokens (words) may arise in relation to many different user intents.

When the corpus is large, lexical conflict or multiple semantic interpretations add to the complexity of satisfying user intent without a dialog to clarify these conflicts and ambiguities. Sometimes it may not even be possible to understand user intent, or the semantics of the sentence that expresses the intent—similar to what happens in real life conversations between humans. The ability of the system to ask the minimal number of questions (from the point of view of comprehending the other person in the conversation) to understand user intent, just like a human would do (on average where the participants are both aware of the domain being discussed), would define the closeness of the system to human conversations.

Systems that engage in a dialog or conversation, which go beyond the simple multi-step travel/dinner reservation making (e.g., where the steps in the dialog are well defined request/response subsequences with not much ambiguity resolution in each step), also encounter the complexity of having to maintain the state of the conversation in order to be effective. For example, such systems would need to infer implicit references to intents and entities (e.g., reference to people, objects or any noun) and attributes that qualify the intent in user's sentences (e.g., "show me the latest movies of Tom Hanks and not the old ones; "show me more action and less violence). Further still, applicants have discovered that it is beneficial to track not only references made by the user to entities, attributes, etc. in previous entries, but also to entities, attributes, etc. of multi-modal responses of the system to the user.

Further still, applicants have found that maintaining pronoun to object/subject associations during user/system exchanges enhances the user experience. For example, a speech analyzer (or natural language processor) that relates the pronoun "it" to its object/subject "Led Zeppelin song" in a complex user entry, such as, "The Led Zeppelin song in the original sound track of the recent Daniel Craig movie. Who performed it?" assists the user by not requiring the user to always use a particular syntax. However, this simple pronoun to object/subject association is ineffective in processing the following exchange:
Q1: Who acts as Obi-wan Kenobi in the new star wars?
A1: Ewan McGregor.
Q2: How about his movies with Scarlet Johansson?

Here the "his" in the second question refers to the person in the response, rather than from the user input. A more complicated example follows:

Q1: Who played the lead roles in Kramer vs. Kramer?
A1: Meryl Streep and Dustin Hoffman.
Q2: How about more of his movies?
A2: Here are some of Dustin Hoffman movies . . . [list of Dustin Hoffman movies].
Q3: What about more of her movies?

Here the "his" in Q2 and "her" in Q3 refer back to the response A1. A natural language processor in isolation is ineffective in understanding user intent in these cases. In several of the embodiments described below, the language processor works in conjunction with a conversation state engine and domain specific information indicating male and female attributes of the entities that can help resolve these pronoun references to prior conversation exchanges.

Another challenge facing systems that engage a user in conversation is the determination of the user's intent change, even if it is within the same domain. For example, user may start off with the intent of finding an answer to a question, e.g., in the entertainment domain. While engaging in the conversation of exploring more about that question, decide to pursue a completely different intent path. Current systems expect user to offer a clear cue that a new conversation is being initiated. If the user fails to provide that important clue, the system responses would be still be constrained to the narrow scope of the exploration path user has gone down, and will constrain users input to that narrow context, typically resulting undesirable, if not absurd, responses. The consequence of getting the context wrong is even more glaring (to the extent that the system looks comically inept) when user chooses to switch domains in the middle of a conversation. For instance, user may, while exploring content in the entertainment space, say, "I am hungry?"). If the system does not realize this as a switch to a new domain (restaurant/food domain), it may respond thinking "I am hungry" is a question posed in the entertainment space and offer responses in that domain, which in this case, would be a comically incorrect response.

A human, on the other hand, naturally recognizes such a drastic domain switch by the very nature of the statement, and responds accordingly (e.g., "Shall we order pizza?"). Even in the remote scenario where the transition to new domain is not so evident, a human participant may falter, but quickly recover, upon feedback from the first speaker ("Oh no. I mean I am hungry—I would like to eat!"). These subtle, yet significant, elements of a conversation, that humans take for granted in conversations, are the ones that differentiate the richness of human-to-human conversations from that with automated systems.

In summary, embodiments of the techniques disclosed herein attempt to closely match user's intent and engage the user in a conversation not unlike human interactions. Certain embodiments exhibit any one or more of the following, non-exhaustive list of characteristics: a) resolve ambiguities in intent and/or description of the intent and, whenever applicable, leverage off of user's preferences (some implementations use computing elements and logic that are based on domain specific vertical information); b) maintain state of active intents and/or entities/attributes describing the intent across exchanges with the user, so as to implicitly infer references made by user indirectly to intents/entities/attributes mentioned earlier in a conversation; c) tailor responses to user, whenever applicable, to match user's preferences; d) implicitly determine conversation boundaries that start a new topic within and across domains and tailor a response accordingly; e) given a failure to understand user's intent (e.g.; either because the intent cannot be found or the confidence score of its best guess is below a threshold), engage in a minimal dialog to understand user intent (in a manner similar to that done by humans in conversations to understand intent.) In some embodiments of the invention, the understanding of the intent may leverage off the display capacity of the device (e.g., like a tablet device) to graphically display intuitive renditions that user could interact with to offer clues on user intent.

BRIEF SUMMARY OF THE INVENTION

In an aspect of the invention, a method of and system for inferring user intent in search input in a conversational interaction system is disclosed.

In another aspect of the invention, a method of inferring user intent in a search input based on resolving ambiguous portions of the search input includes providing access to a set of content items. Each of the content items is associated with metadata that describes the corresponding content item. The method also includes providing a user preference signature. The user preference signature describes preferences of the user for at least one of (i) particular content items and (ii) metadata associated with the content items. The method also includes receiving search input from the user. The search input is intended by the user to identify at least one desired content item. The method also includes determining that a portion of the search input contains an ambiguous identifier. The ambiguous identifier being intended by the user to identify, at least in part, the at least one desired content item. The method also includes inferring a meaning for the ambiguous identifier based on matching portions of the search input to the preferences of the user described by the user preference signature and selecting content items from the set of content items based on comparing the search input and the inferred meaning of the ambiguous identifier with metadata associated with the content items.

In a further aspect of the invention, the ambiguous identifier can be a pronoun, a syntactic expletive, an entertainment genre, and/or at least a portion of a name.

In still another aspect of the invention, the metadata associated with the content items includes a mapping of relationships between entities associated with the content items.

In yet a further aspect of the invention, the user preference signature is based on explicit preferences provided by the user and/or is based on analyzing content item selections by user conducted over a period of time. Optionally, the user preference signature describes preferences of the user for metadata associated with the content items, the metadata including entities preferred by the user.

In another aspect of the invention, a method of inferring user intent in a search input based on resolving ambiguous portions of the search input includes providing access to a set of content items. Each of the content items is associated with metadata that describes the corresponding content item. The method also includes receiving search input from the user. The search input is intended by the user to identify at least one desired content item. The method also includes determining whether or not a portion of the search input contains an ambiguous identifier. The ambiguous identifier being intended by the user to identify, at least in part, the at least one desired content item. Upon a condition in which a portion of the search input contains an ambiguous identifier, the method includes: inferring a meaning for the ambiguous identifier based on matching portions of the search input to preferences of the user described by a user preference signature, selecting content items from the set of content items based on comparing the search input and the inferred meaning of the ambiguous identifier with metadata associated with the content item, and, upon a condition in which the search input does not contain an ambiguous identifier, selecting content items from the set of content items based on comparing the search input with metadata associated with the content items.

Any of the aspects listed above can be combined with any of the other aspects listed above and/or with the techniques disclosed herein.

BRIEF DESCRIPTION OF THE SEVERAL VIEWS OF THE DRAWINGS

For a more complete understanding of various embodiments of the present invention, reference is now made to the following descriptions taken in connection with the accompanying drawings in which:

FIG. 1 illustrates a user interface approach incorporated here for elucidative purposes.

FIG. 2 illustrates a user interface approach orated here for elucidative purposes.

FIG. 5 illustrates a user interface approach incorporated here for elucidative purposes.

DETAILED DESCRIPTION

Figure 3:
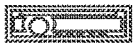
FIG. 3 illustrates a user interface approach incorporated here for elucidative purposes.

Preferred embodiments of the invention include methods of and systems for inferring user's intent and satisfying that intent in a conversational exchange. Certain implementations are able to resolve ambiguities in user input, maintain state of intent, entities, and/or attributes associated with the conversational exchange, tailor responses to match user's preferences, infer conversational boundaries that start a new topic (i.e. infer a change of a conversational session), and/or engage in a minimal dialog to understand user intent. The concepts that follow are used to describe embodiments of the invention.

Information Repositories

Information repositories are associated with domains, which are groupings of similar types of information and/or certain types of content items. Certain types of information repositories include entities and relationships between the entities. Each entity/relationship has a type, respectively, from a set of types. Furthermore, associated with each entity/relationship are a set of attributes, which can be captured, in some embodiments, as a defined finite set of name-value fields. The entity/relationship mapping also serves as a set of metadata associated with the content items because the entity/relationship mapping provides information that describes the various content items. In other words, a particular entity will have relationships with other entities, and these "other entities" serve as metadata to the "particular entity". In addition, each entity in the mapping can have attributes assigned to it or to the relationships that connect the entity to other entities in the mapping. Collectively, this makes up the metadata associated with the entities/content items. In general, such information repositories are called structured information repositories. Examples of information repositories associated with domains follow.

A media entertainment domain includes entities, such as, movies, TV-shows, episodes, crew, roles/characters, actors/personalities, athletes, games, teams, leagues and tournaments, sports people, music artists and performers, composers, albums, songs, news personalities, and/or content distributors. These entities have relationships that are captured in the information repository. For example, a movie entity is related via an "acted in" relationship to one or more actor/personality entities. Similarly, a movie entity may be related to an music album entity via an "original sound track" relationship, which in turn may be related to a song entity via a "track in album" relationship. Meanwhile, names, descriptions, schedule information, reviews, ratings, costs, URLs to videos or audios, application or content store handles, scores, etc. may be deemed attribute fields.

A personal electronic mail (email) domain includes entities, such as, emails, email-threads, contacts, senders, recipients, company names, departments/business units in the enterprise, email folders, office locations, and/or cities and countries corresponding to office locations. Illustrative examples of relationships include an email entity related to its sender entity (as well as the to, cc, bcc, receivers, and email thread entities.) Meanwhile, relationships between a contact and his or her company, department, office location can exist. In this repository, instances of attribute fields associated with entities include contacts' names, designations, email handles, other contact information, email sent/received timestamp, subject, body, attachments, priority levels, an office's location information, and/or a department's name and description.

A travel-related/hotels and sightseeing domain includes entities, such as, cities, hotels, hotel brands, individual points of interest, categories of points of interest, consumer facing retail chains, car rental sites, and/or car rental companies. Relationships between such entities include location, membership in chains, and/or categories. Furthermore, names, descriptions, keywords, costs, types of service, ratings, reviews, etc. all amount of attribute fields.

An electronic commerce domain includes entities, such as, product items, product categories and subcategories, brands, stores, etc. Relationships between such entities can include compatibility information between product items, a product "sold by" a store, etc. Attribute fields in include descriptions, keywords, reviews, ratings, costs, and/or availability information.

An address book domain includes entities and information such as contact names, electronic mail addresses, telephone numbers, physical addresses, and employer.

The entities, relationships, and attributes listed herein are illustrative only, and are not intended to be an exhaustive list.

Embodiments of the present invention may also use repositories that are not structured information repositories as described above. For example, the information repository corresponding to network-based documents (e.g., the Internet/World Wide Web) can be considered a relationship web of linked documents (entities). However, in general, no directly applicable type structure can meaningfully describe, in a nontrivial way, all the kinds of entities and relationships and attributes associated with elements of the Internet in the sense of the structured information repositories described above. However, elements such as domain names, internet media types, filenames, filename extension, etc. can be used as entities or attributes with such information.

For example, consider a corpus consisting of a set of unstructured text documents. In this case, no directly applicable type structure can enumerate a set of entities and relationships that meaningfully describe the document contents. However, application of semantic information extraction processing techniques as a pre-processing step may yield entities and relationships that can partially uncover structure from such a corpus.

Illustrative Examples of Accessing Information Repositories Under Certain Embodiments of the Present Invention The following description illustrates examples of information retrieval tasks in the context of structured and unstructured information repositories as described above.

In some cases, a user is interested in one or more entities of some type—generally called intent type herein—which the user wishes to uncover by specifying only attribute field constraints that the entities must satisfy. Nate that sometimes intent may be a (type, attribute) pair when the user wants some attribute of an entity of a certain type. For example, if the user wants the rating of a movie, the intent could be viewed as (type, attribute)=(movie, rating). Such query-constraints are generally called attribute-only herein.

Whenever the user names the entity or specifies enough information to directly match attributes of the desired intent type entity, it is an attribute-only constraint. For example, when the user identifies a movie by name and some additional attribute (e.g., 'Cape Fear' made in the 60s), or when he specifies a subject match for the email he wants to uncover, or when he asks far hotels based on a price range, or when he specifies that he wants a 32 GB, black colored iPod touch.

However, in some cases, a user is interested in one or more entities of the intent type by specifying not only attribute field constraints on the intent type entities but also by specifying attribute field constraints on or naming other entities to which the intent type entities are connected via relationships in some well defined way. Such query-constraints are generally called connection oriented constraints herein.

An example of a connection oriented constraint is when the user wants a movie (an intent type) based on specifying two or more actors of the movie or a movie based on an actor and an award the movie won. Another example, in the context of email, is if the user wants emails (intent type) received from certain senders from a particular company in the last seven days. Similarly, a further example is if the user wants to book a hotel room (intent type) to a train station as well as a Starbucks outlet. Yet another example is if the user wants a television set intent type) made by Samsung that is also compatible with a Nintendo Wii. All of these are instances of connection oriented constraints queries.

In the above connection-oriented constraint examples, the user explicitly describes or specifies the other entities connected to the intent entities. Such constraints are generally called explicit connection oriented constraints and such entities as explicite entities herein.

Meanwhile, other queries contain connection oriented constraints that include unspecified or implicit entities as part of the constraint specification. In such a situation, the user is attempting to identify apiece of information, entity, attribute, etc. that is not know through relationships between the unknown item and items the user does now. Such constraints are generally called implicit connection oriented constraints herein and the unspecified entities are generally called implicit entities of the constraint herein.

For example, the user may wish to identify movie she is seeking via naming two characters in the movie. However, the user does not recall the name of one of the characters, but she does recall that a particular actor played the character. Thus, in her query, she states one character by name and identifies the unknown character by stating that the character was played by the particular actor.

In the context of email repository, an example includes a user wanting to get the last email (intent) from an unspecified gentleman from a specified company 'Intel' to whom he was introduced via email (an attribute specifier) last week. In this case, the implicit entity is a contact who can be discovered by examining contacts from 'Intel', via an employee/company relationship, who was a first time common-email-recipient with the user last week.

Further examples of implicit connection oriented constrains are described in more detail below.

In the context of connection oriented constraints, it is useful to map entities and relationships of information repositories to nodes and edges of a graph. The motivation for specifically employing the graph model is the observation that relevance, proximity, and relatedness in natural language conversation can be modeled simply by notions such as link-distance and, in some cases, shortest paths and smallest weight trees. During conversation when a user dialog involves other entities related to the actually sought entities, a subroutine addressing information retrieval as a simple graph search problem effectively helps reduce dependence on deep unambiguous comprehension of sentence structure. Such an approach offers system implementation benefits. Even if the user intent calculation is ambiguous or inconclusive, so long as entities have been recognized in the user utterance, a graph-interpretation based treatment of the problem enables a system to respond in a much more intelligible manner than otherwise possible, as set forth in more detail below.

Attribute-Only Constraints

What follows are examples of information retrieval techniques that enable the user to specify attribute-only constraints. While some of these techniques are known in the art (where specified), the concepts are presented here to illustrate how these basic techniques can be used with the inventive techniques described herein to enhance the user experience and improve the quality of the search results that are returned in response to the user's input.

Examples of Attributes-Only Constraints During Information Retrieval from a Movie/TV Search Interface FIG. 1 shows a search interface 100 for a search engine for movie and television content that is known in the art i.e., the IMDb search interface). FIG. 1 includes a pull-down control 105 that allows the user to expressly select an entity type or attribute. For example, Title means intent entity type is Movie or TV Show, TV Episode means the intent type is Episode, Names means intent type is Personality, Companies means the intent type is Company (e.g., Production house or Studio etc.), Characters means the intent type is Role. Meanwhile, Keywords, Quotes, and Plots specify attribute fields associated with intent entities of type Movie or TV Show or Episode that are sought to be searched. Meanwhile, the pull-down control 110 allows the user to only specify attributes for entities of type Movie, Episode, or TV Show.

FIG. 2 shows the Advanced Title Search graphical user interface of the IMDB search interface (known in the art) 200. Here, the Title Type choice 205 amounts to selection of intent entity type. Meanwhile, Release Date 210, User Rating 215, and Number of Votes 220 are all attributes of entities of type movies, TV Shows, episodes, etc. If the number of Genres 225 and Title Groups 230 shown here is deemed small enough, then those genres and title groups can be deemed descriptive attributes of entities. So the genre and title groups section here is also a way of specifying attribute constraints. The Title Data 235 section is specifying the constraint corresponding to the data source attribute.

Examples of Attributes-Only Constraints During Information Retrieval from an Electronic-Commerce Search Interface FIG. 3 illustrates a graphical user interface 300 for an electronic-commerce website's search utility that is known in the art. In previous examples, the user interface allowed users to specify sets of attribute constraints before initiating any search in the information repository. Meanwhile, FIG. 3 shows the user interface after the user has first launched a text-only search query 'car stereo'. Based on features and attributes associated with the specific results returned by the text search engine for the text search query 305, the post-search user interface is constructed by dynamically picking a subset of attributes for this set of search results, which allows the user to specify further attribute constraints for them. As a result, the user is forced to follow the specific flow of first doing a text search or category filtering and then specifying the constraints on further attributes.

This 'hard-coded' flow of first search followed by post-search attribute filters—results from a fundamental limitation of this style of graphical user interface because it simply cannot display all of the meaningful attributes up-front without having any idea of the product the user has in mind. Such an approach is less efficient that the inventive techniques disclosed herein because the user may want to declare some of the attribute constraints he or she has in mind at the beginning of the search. This problem stems, in part, from the fact that even though the number of distinct attributes for each individual product in the database is a finite number, the collective set is typically large enough that a graphical user interface cannot display a sufficient number of the attributes, thereby leading to the hard coded flow.

Note that the conversational interface embodiments disclosed herein do not suffer from physical spatial limitations. Thus, a user can easily specify any attribute constraint in the first user input.

Explicit Connection Oriented Constraints

What follows are examples of explicit connection oriented constraints employed in information retrieval systems. Graph model terminology of nodes and edges can also be used to describe connection oriented constraints as can the terminology of entities and relationships.

Figure 4:
FIG. 4 illustrates a user interface approach incorporated here for elucidative purposes.

When using an attribute-only constraints interface, the user only specifies the type and attribute constraints on intent entities. Meanwhile, when using an explicit connected node constraints interface, the user can additionally specify the type and attribute constraints on other nodes connected to the intent nodes via specified kinds of edge connections. One example of an interface known in the art that employs explicit connected node constraints during information retrieval is a Movie/TV information search engine 400 shown in FIG. 4.

Considering that the number of possible death and birth places 405 across all movie and TV personalities is a huge number, birth and death places are treated as nodes rather than attributes in the movie information repository graph. Thus; birth and death place specifications in the graphical user interface 400 are specifications for nodes connected to the intended personality node. The filmography filter 410 in the graphical user interface 400 allows a user to specify the name of a movie or TV show node, etc., which is again another node connected to the intended personality node. The other filters 500, shown in FIG. 5, of the graphical user interface are specifiers of the attributes of the intended node.

In the first part of the graphical user interface 400, a user may specify two movie or TV show nodes when his intent is to get the personalities who collaborated on both these nodes. In the second part of the graphical UI above; a user may specify two personality nodes when his intent is to get movie or TV show nodes corresponding to their collaborations. In both case, the user is specifying connected nodes other than his intended nodes, thereby making this an explicit connected node constraint. However, the interfaces known in the art do not support certain types of explicit connected node constraints (explicit connection oriented constraints', as described below.

Figure 6:
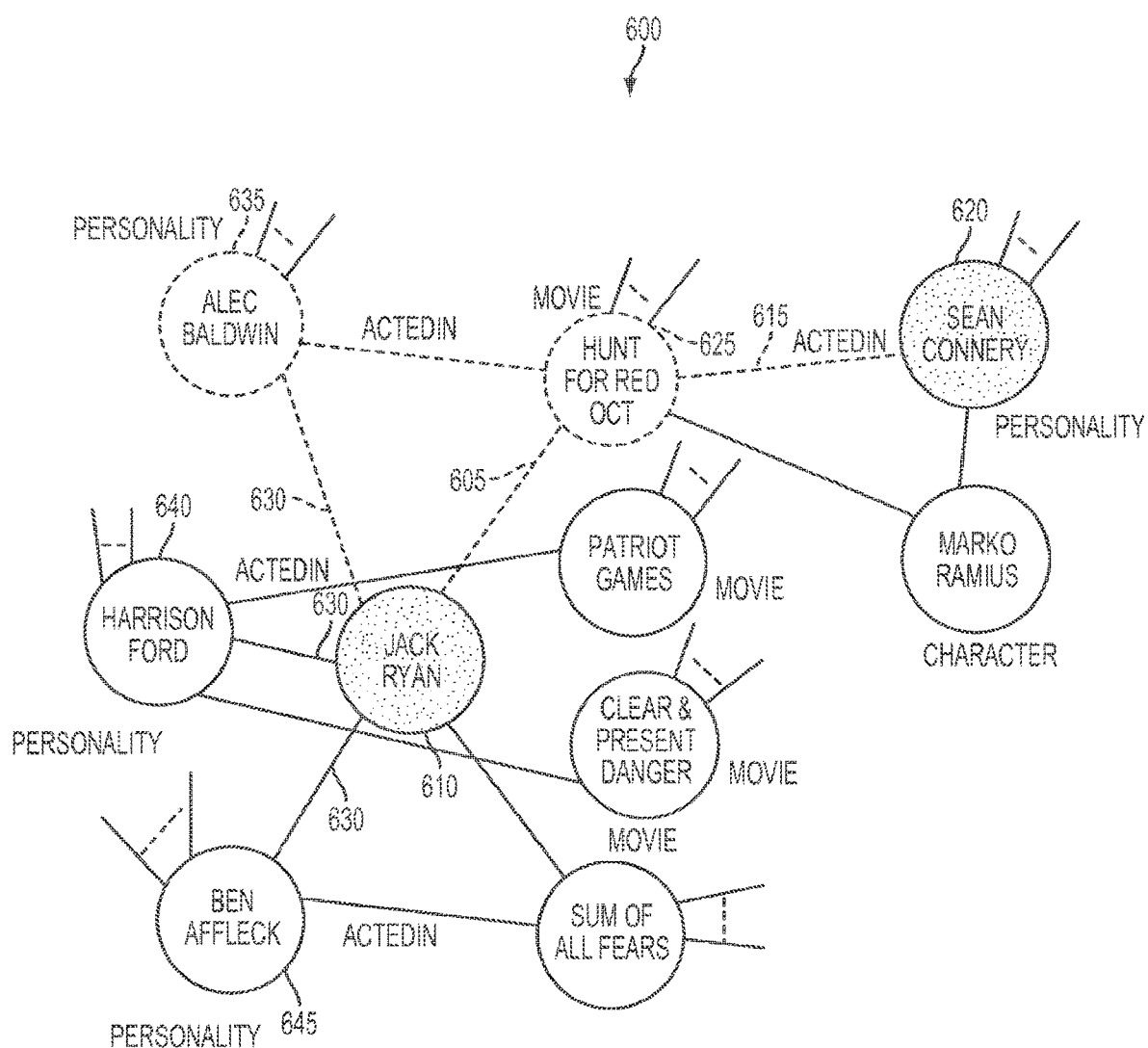
FIG. 6 illustrates an example of a graph that represents entities and relationships between entities.

FIG. 6 illustrates a graph 600 of the nodes (entities) and edges (relationships) analyzed by the inventive techniques disclosed herein to arrive at the desired result when the user seeks a movie based on the fictional character Jack Ryan that stars Sean Connery. The user may provide the query, "What movie has Jack Ryan and stars Sean Connery?" The techniques herein interpret the query, in view of the structured information repositories as: Get the node of type Movie (intent) that is connected by an edge 605 to the explicit node of type Role named 'Jack Ryan' 610 and also connected via an 'Acted In' edge 615 to the explicit node of type Personality named 'Sean Connery' 620. The techniques described herein return the movie 'The Hunt for the Red October' 625 as a result.

Referring again to FIG. 6; assume the user asks, "Who are all of the actors that played the character of Jack Ryan?" The disclosed techniques would interpret the query as:

Get nodes of type Personality (intent) connected by means of an 'Acted-as' edge 630 to the explicit node of type Role named 'Jack Ryan' 610. Embodiments of the inventive systems disclosed herein would return the actors 'Alec Baldwin' 635, 'Harrison Ford' 640, and 'Ben Affleck.' 645.

A further example is a user asking for the name of the movie starring Tom Cruise based on a John Grisham book. Thus, the query becomes: Get the node of type Movie (intent) connected by an 'Acted in' edge to the explicit node of type Personality named Toni Cruise and connected by a 'Writer' edge to the explicit node of type Personality named 'John Grisham'. Embodiments of the inventive systems disclosed herein would return the movie 'The Firm'.

Implicit Connection Oriented Constraints

The following examples illustrate the implicit connection oriented constraints and implicit entities used for specific information retrieval goals. The first two examples used the terminology of entities and relationships.

Figure 7:
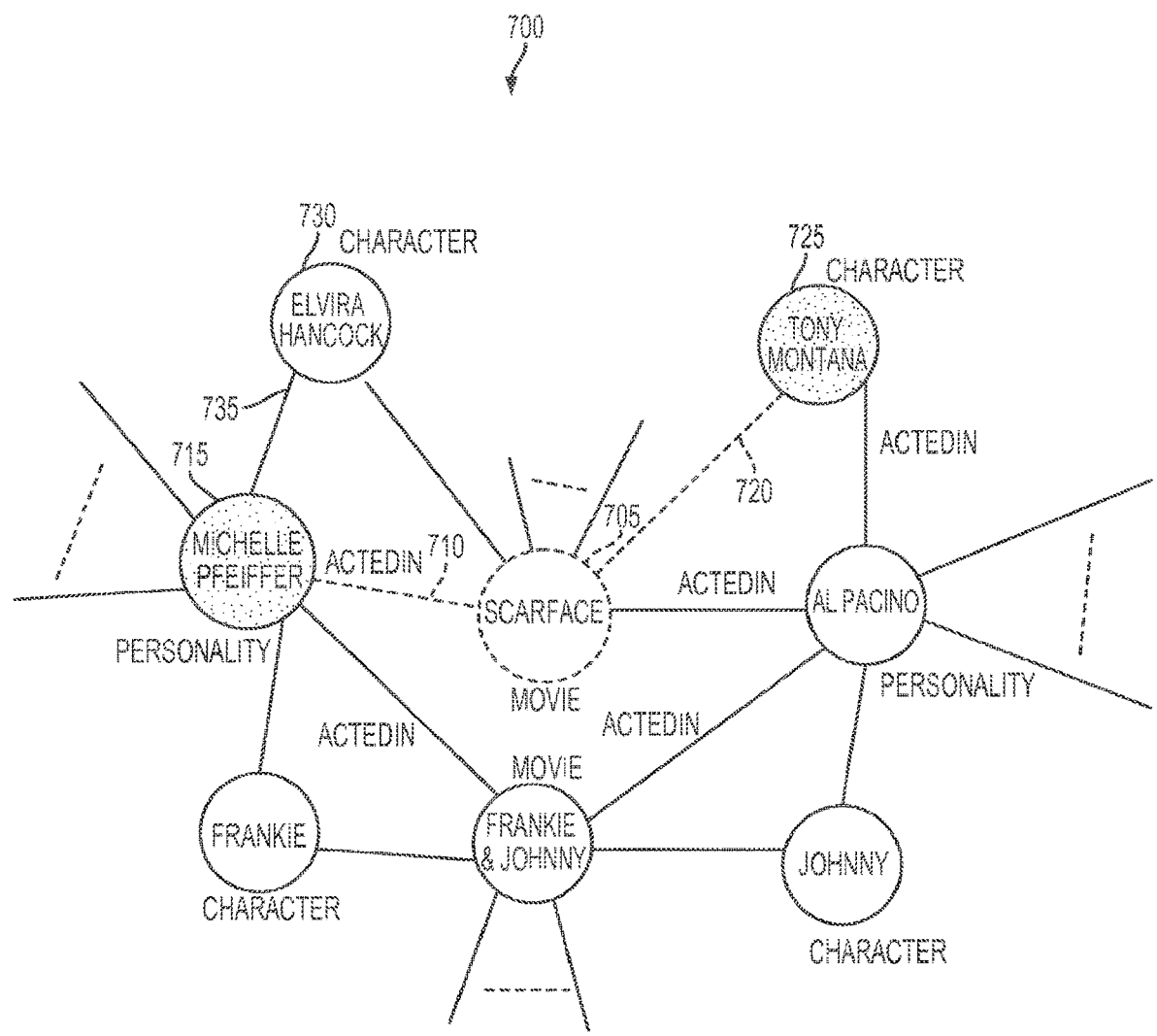
FIG. 7 illustrates an example of a graph that represents entities and relationships between entities.

In one example, the user wants the role (intent) played by a specified actor/personality (e.g., Michelle Pfeiffer) in an unspecified movie that is about a specified role (e.g., the character Tony Montana.) In this case, the user's constraint includes an unspecified or implicit entity. The implicit entity is the movie 'Scarface'. FIG. 7 illustrates a graph 700 of the entities and relationships analyzed by the techniques disclosed herein to arrive at the desired result. The graph 700 is an illustrative visual representation of a structured information repository. Specifically, the implicit movie entity 'Scarface' 705 is arrived at via a 'Acted In' relationship 710 between the movie entity 'Scarface' 705 and the actor entity 'Michelle Pfeiffer' 715 and a 'Character In' relationship 720 between the character entity 'Tony Montana' 725 and the movie entity 'Scarface' 705. The role entity 'Elvira Hancock' 730 played by 'Michelle Pfeiffer' is then discovered by the 'Acted by' relationship 735 to 'Michelle Pfeiffer' and the 'Character In' relationship 740 to the movie entity 'Scarface' 705.

Figure 8:
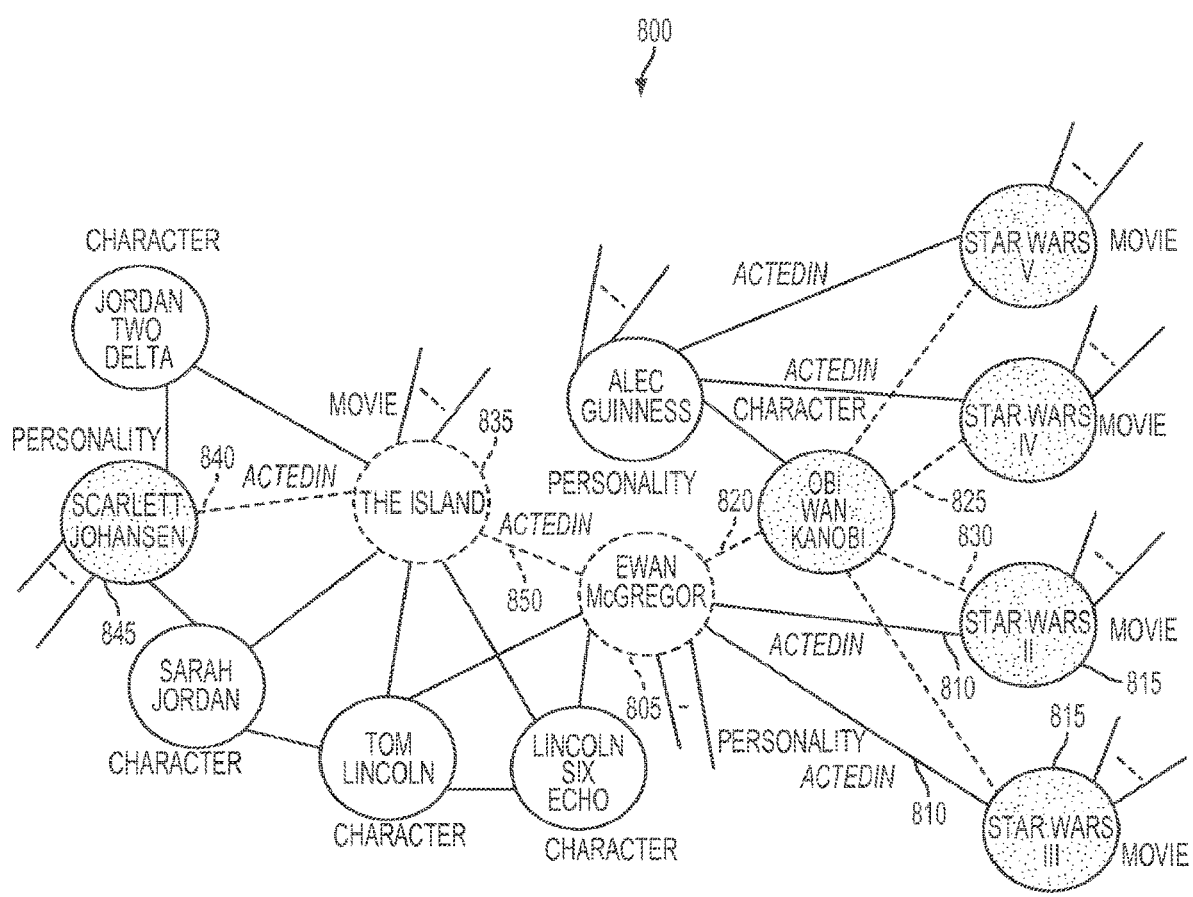
FIG. 8 illustrates an example of a graph that represents entities and relationships between entities.

In a further example, suppose that the user wants the movie (intent) starring the specified actor entity Scarlett Johansson and the unspecified actor entity who played the specified role of Obi-Wan Kenobi in a specified movie entity Star Wars. In this case, the implicit entity is the actor entity 'Ewan McGregor' and the resulting entity is the movie 'The island' starring 'Scarlett Johansson' and ° Ewan McGregor'. FIG. 8 illustrates a graph 800 of the entities and relationships analyzed by the techniques disclosed herein to arrive at the desired result. Specifically, the implicit actor entity Ewan McGregor 805 is arrived at via an Acted In relationship 810 with at least one movie entity Star Wars 815 and via a Character relationship 820 to a character entity Obi-Wan Kenobi 825, which in turn is related via a Character relationship 830 to the movie entity Star Wars 815. Meanwhile, the result entity The Island 835 is arrived at via an Acted In relationship 840 between the actor/personality entity Scarlett Johansson 845 and the movie entity The Island 835 and an Acted In relationship 850 between the implicit actor entity Ewan McGregor 805 and the movie entity The island.

Figure 9:
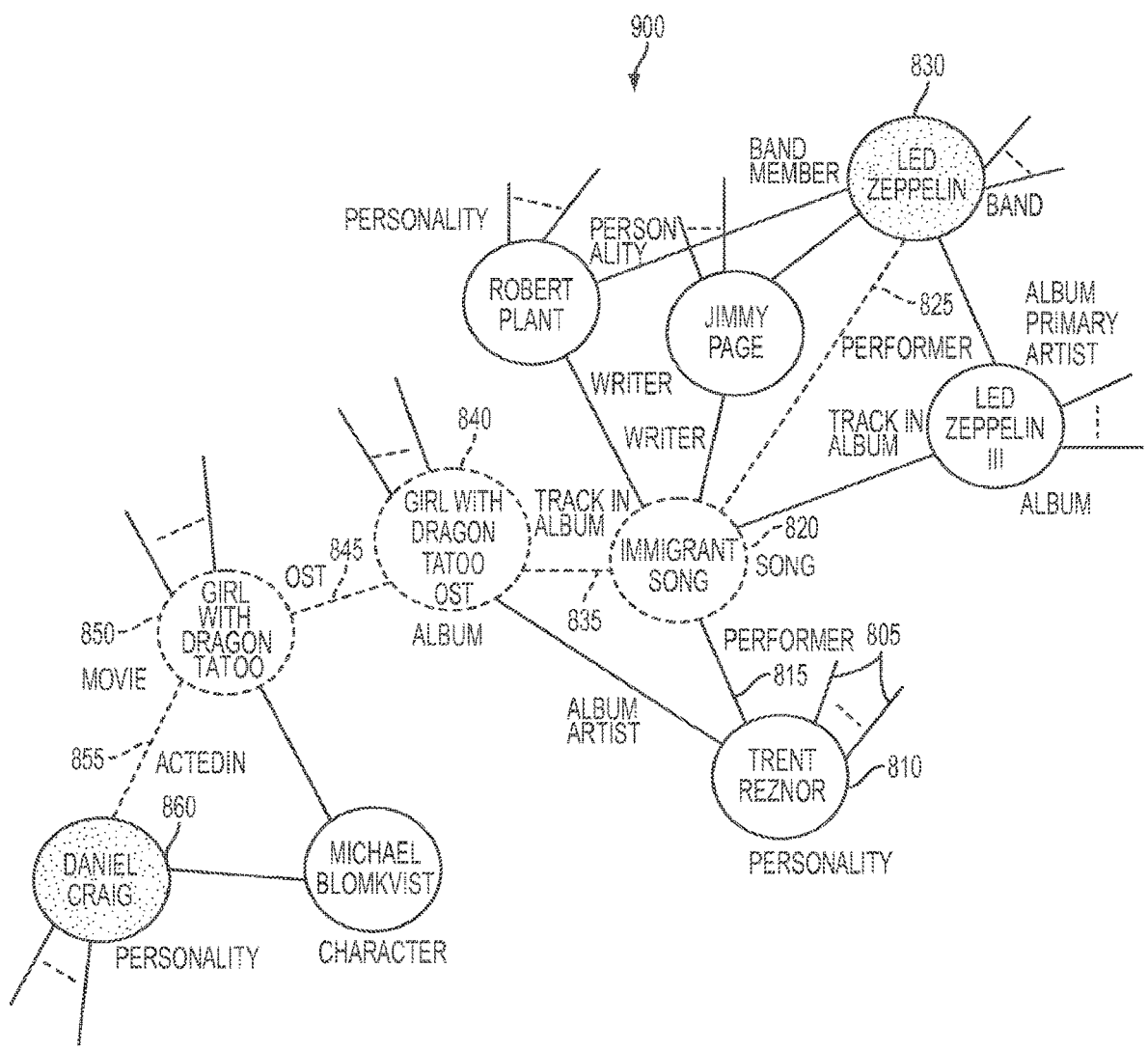
FIG. 9 illustrates an example of a graph that represents entities and relationships between entities.

FIG. 9 illustrates a graph 900 of the entities and relationships analyzed by the techniques disclosed herein to arrive at a desired result. This example uses the terminology of nodes and edges. The user knows that there is a band that covered a Led Zeppelin song for a new movie starring Daniel Craig. The user recalls neither the name of the covered song nor the name of the movie, but he wants to explore the other music (i.e., songs) of the band that did that Led Zeppelin cover. Thus, by specifying the known entities of Led Zeppelin (as the song composer) and Daniel Craig (as an actor in the movie), the interposing implied nodes are discovered to find the user's desired result. Thus, embodiments of the inventive techniques herein compose the query constraint as follows: Return the nodes of type Song (intent) connected by a 'Composer' edge 905 to an implicit node of type Band 910 (Trent Reznor) such that this Band node has a 'Cover Performer' edge 915 with an implicit node of type Song 920 (Immigrant Song) which in turn has a 'Composer' edge 925 with an explicit node of type Band named 'Led Zeppelin' 930 and also a 'Track in Album' edge 935 with an implicit node of type Album 940 (Girl with the Dragon Tattoo Original Sound Track) which has an 'Original Sound Track (OST)' edge 945 with an implicit node of type Movie 950 (Girl with the Dragon Tattoo Original Sound Track) that has an 'Acted In' edge 955 with the explicit node of type Personality named 'Daniel Craig'. 960.

As mentioned above, known techniques and syste s for information retrieval suffer from a variety of problems. Described herein are embodiments of an inventive conversational interaction interface. These embodiments enable a user to interact with an information retrieval system by posing a query and/or instruction by speaking to it and, optionally, selecting options by physical interaction (e.g., touching interface, keypad, keyboard, and/or mouse). Response to a user query may be perthrmed by machine generated spoken text to speech and may be supplemented by information displayed on a user screen. Embodiments of the conversation interaction interface, in general, allow a user to pose his next information retrieval query or instruction in reaction to the information retrieval system's response to a previous query, so that an information retrieval session is a sequence of operations, each of which has the user first posing a query or instruction and the system the presenting a response to the user.

Embodiments of the present invention are a more powerful and expressive paradigm than graphical user interfaces for the query-constraints discussed herein. In many situations, especially when it comes to flexibly selecting from among a large number of possible attributes or the presence of explicit and implicit connected nodes, the graphical user interface approach does not work well or does not work at all. In such cases, embodiments of the conversational interaction interface of the present invention are a much more natural fit. Further, embodiments of the present invention are more scalable in terms of the number of distinct attributes a user may specify as well as the number of explicit connected node constraints and the number of implicit node constraints relative to graphical user interfaces.

Conversational System Architecture

Figure 10:
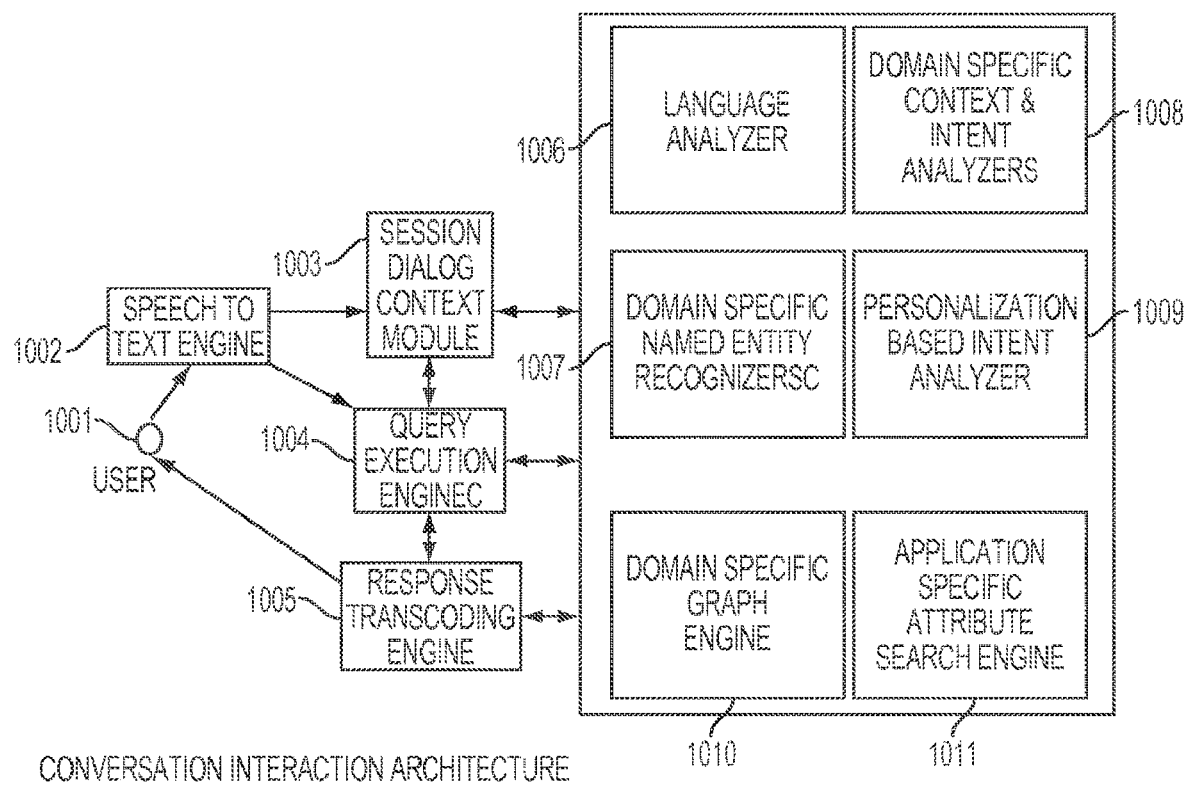
FIG. 10 illustrates an architecture that is an embodiment of the present invention.

FIG. 10 represents the overall system architecture 1000 of an embodiment of the present invention. User 1001 speaks his or her question that is fed to a speech to text engine 1002. While the input could be speech, the embodiment does not preclude the input to be direct text input. The text form of the user input is fed to session dialog content module 1003. This module maintains state across a conversation session, a key use of which is to help in understanding user intent during a conversation, as described below.

The session dialog content module 1003, in conjunction with a Language Analyzer 1006, a Domain Specific Named Entity Recognizer 1007, a Domain Specific Context and intent Analyzer 1008, a Personalization Based Intent Analyzer 1009, a Domain Specific Graph Engine 1010, and an Application Specific Attribute Search Engine 1011 (all described in more detail below) process the user input so as to return criteria to a Query Execution Engine 1004. The Query Execution Engine 1004 uses the criteria to perform a search of any available source of information and content to return a result set.

A Response Transcoding Engine 1005, dispatches the result set to the user for consumption, e.g., in the device through which user is interacting. If the device is a tablet device with no display constraints, embodiments of the present invention may leverage off the display to show a graphical rendition of connection similar in spirit to FIGS. 7, 6, 9, and 8, with which the user can interact with to express intent. In a display-constrained device such as a smartphone, the Response Transcoding Engine 105 may respond with text and/or speech (using a standard text to speech engine).

While FIG. 10 is a conversation architecture showing the modules for a specific domain, the present embodiment is a conversation interface that can take user input and engage in a dialog where user's intent can span domains. In an embodiment of the invention, this is accomplished by having multiple instances of the domain specific architecture shown in FIG. 10, and scoring the intent weights across domains to determine user intent. This scoring mechanism is also used to implicitly determine conversation topic switching (for example, during a entertainment information retrieval session, a user could just say "I am hungry").

Figure 11:
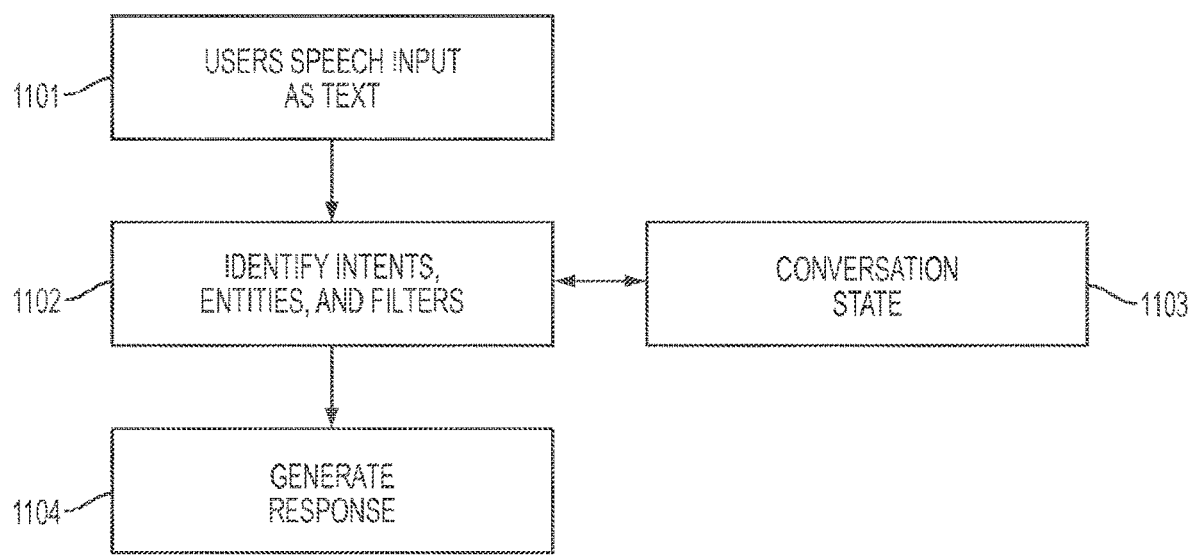
FIG. 11 illustrates a simplified flowchart of the operation of embodiments of the invention.

FIG. 11 illustrates a simplified flowchart of the operation of embodiments of the invention. First, the user's speech input is converted to text by a speech recognition engine 1101. The input is then broken down into intent, entities, and attributes 1102. This process is assisted by information from the prior conversation state 1103. The breakdown into intents, entities, and attributes, enables the system to generate a response to the user 1104. Also, the conversation state 1103 is updated to reflect the modifications of the current user input and any relevant returned response information.

Figure 12:
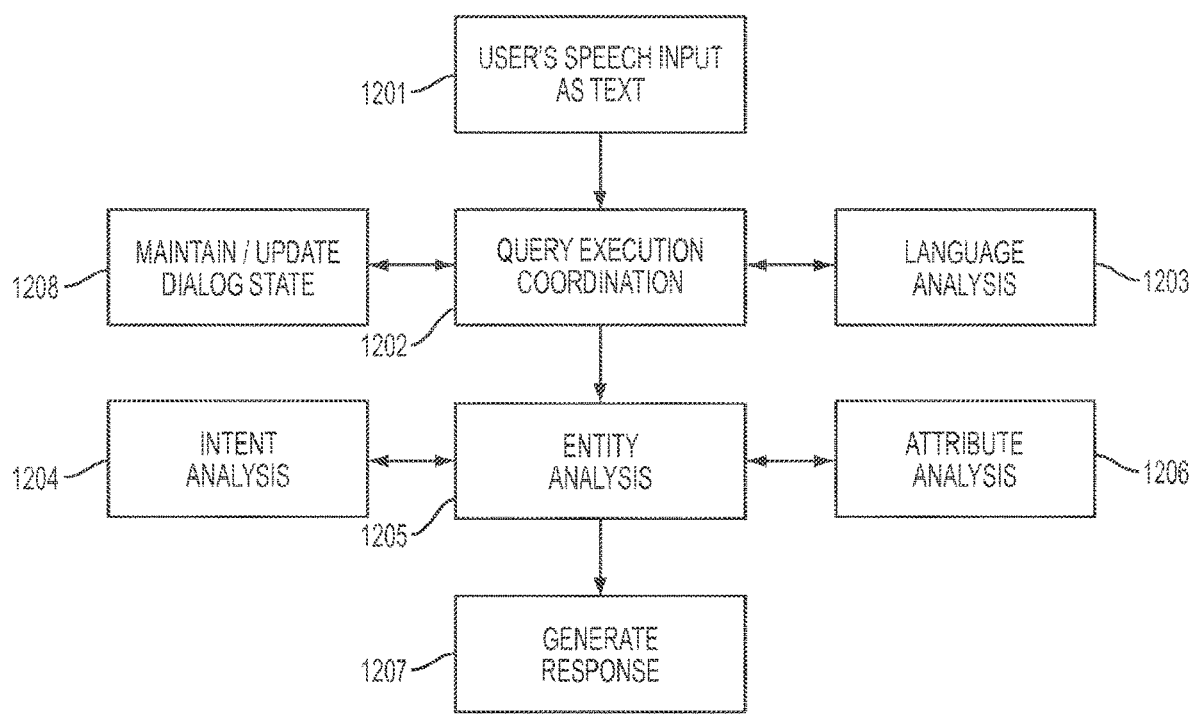
FIG. 12 illustrates a control flow of the operation of embodiments of the invention.

FIG. 12 illustrates the control flow in more detail. First, the user's speech is input to the process as text 1201. Upon receiving the user input as text, query execution coordination occurs 1202. The query execution coordination 1202 oversees the breakdown of the user input to understand user's input. The query execution coordination 1202 makes use of language analysis 1203 that parses the user input and generates a parse tree. The query execution coordination 1202 also makes use of the maintenance and updating of the dialog state 1208. The parse tree and any relevant dialog state values are passed to modules that perform intent analysis 1204, entity analysis 1205, and attribute analysis 1206. These analysis processes work concurrently, because sequential processing of these three analysis steps may not be possible. For instance, in some cases of user input, the recognition of entities may require the recognition of intents and vice versa. These mutual dependencies can only be resolved by multiple passes on the input by the relevant modules, until the input is completely analyzed. Once the breakdown and analysis is complete, a response to the user is generated 1207. The dialog state is also updated 1208 to reflect the modifications of the current input and return of relevant results. The other words, certain linguistic elements (e.g., spoken/recognized words and/or phrases) are associated with the present conversation session.

Referring again to FIG. 10, in one illustrative embodiment, the Session Dialog Content Module 1003, in conjunction with a Language Analyzer 1006, and the other recognizer module, analyzer modules, and/or engines described in more detail below, perform the analysis steps mentioned in connection with FIG. 12 and break down the sentence into its constituent parts. The Language Analyzer 1006 creates a parse tree from the text generated from the user input, and the other recognizer module, analyzer modules, and/or engines operate on the parse tree to determine the constituent parts. Those parts can be broadly categorized as (1) intents—the actual intent of the user (such as "find a movie", "play a song", "tune to a channel", "respond to an email", etc.), (2) entities noun or pronoun phrases describing or associated with the intent; and (3) attributes—qualifiers to entities such as the "latest" movie, "less" violence, etc. Other constituent part categories are within the scope of the invention.

In the context of the goal of providing an intelligent and meaningful conversation, the intent is among the most important of all three categories. Any good search engine can perform an information retrieval task fairly well just by extracting the entities from a sentence—without understanding the grammar or the intent. For instance, the following user question, "Can my daughter watch pulp fiction with me" most search engines would show a link for pulp fiction, which may suffice to find the rating that is most likely available from traversing that link. But in a conversational interface, the expectation is clearly higher—the system must ideally understand the (movie, rating) intent corresponding to the expected response of the rating of the movie and the age group it is appropriate for. A conversational interface response degenerating to that of a search engine is tantamount to a failure of the system from a user perspective. Intent determination and, even more importantly; responding to user's question that appears closer to a human's response when the intent is not known or clearly discernible is an important aspect for a conversational interface that strives to be closer to human interaction than to a search engine.

In this example, although the user never used the word "rating", the system infers that user is looking for rating, from the words "can . . . watch" based on a set of rules and/or a naïve Bayes classifier, described in more details below. Meanwhile, "my daughter" could be recognized as an attribute. In order for the daughter to watch a program, several criteria must be met: the show timing, the show availability, and "watchability" or rating. This condition may be triggered by other attributes too such as "son", "girl", "boy" etc. These could be rules-based domain specific intents or naïve Bayes classifier scoring based on domain specific training sets to look for ratings and show timings in this case. There could also be weightage factor for the satisfiabiltiy of these conditions that is driven by the entity that is being watched.

Intent Analyzer 1008 is a domain specific module that analyzes and classifies intent for a domain and works in conjunction with other modules—domain specific entity recognizer 1007, personalization based intent analyzer 1009 that classifies intent based on user's personal preferences, and the domain specific graph engine 1010. The attribute specific search engine 1011 assists in recognizing attributes and their weights influence the entities they qualify.

The intent analyzer 1008, in an embodiment of the invention, is a rules driven intent recognizer and/or a naïve Bayes classifier with supervised training. The rules and/or training set capture how various words and word sets relate to user intent. It takes as input a parse tree, entity recognizer output, and attribute specific search engine output (discussed above and below). In some implementations, user input may go through multiple entity recognition, the attribute recognition, and intent recognition steps, until the input is frilly resolved. The intent recognizer deciphers the intent of a sentence, and also deciphers the differences in nuances of intent. For instance, given "I would like to see the movie Top Gun" versus "I would like to see a movie like Top Gun", the parse trees would be different. This difference assists the intent recognizer to differentiate the meaning of "like". The rules based recognition, as the very name implies, recognizes sentences based on predefined rules. Predefined rules are specific to a domain space, for example, entertainment. The naïve Bayes classifier component, however, just requires a training data set to recognize intent.

The entity recognizer 1007, using the inputs mentioned above, recognizes entities in user input. Examples of entities are "Tom cruise" in "can I watch a Tom Cruise movie", or "Where Eagles Dare" in "when was Where Eagles Dare released". In certain implementations, the entity recognizer 1007 can be rules driven and/or a Bayes classifer. For example, linguistic elements such as nouns and gerunds can be designated as entities in a set of rules, or that association can arise during a supervised training process for the Bayes classifer. Entity recognition can, optionally, involve error correction or compensation for errors in user input (such as errors in speech to text recognition). When an input matches two entities phonetically, e.g., newman, and neuman, both are picked as likely candidates. In some embodiments, the resolution between these two comes form the information gleaned from the rest of user input, where relationships between entities may weed out one of the possibilities. The classifying of a subset of user input as an entity is only a weighting. There could be scenarios in which an input could be scored as both an entity and as an attribute. These ambiguities are resolved in many cases as the sentence semantics become clearer with subsequent processing of the user input. In certain embodiments, a component used for resolution is the entity relationship graph. In certain implementations, an output of the entity recognizer 1007 is a probability score for subsets of input to be entities.

The application specific attribute search engine 1011 recognizes attributes such as "latest", "recent", "like" etc. Here again, there could be conflicts with entities. For example "Tomorrow Never Dies" is an entity (a movie), and, when used in a sentence, there could be an ambiguity in interpreting "tomorrow" as an attribute. The scoring of tomorrow as an attribute may be lower than the scoring of "tomorrow" as part of "Tomorrow Never Dies" as determined by entity relationship graph (which may depend on other elements of the input, e.g., the words "movie", "show", "actor", etc.). The output of the attribute search engine 1011 is a probability score for input words similar to that of the output of entity recognizer 1007.

The language analyzer 1006 is a pluggable module in the architecture to enable to system to support multiple languages. While understanding the semantics of user input is not constrained to the language analyzer 1006 alone, the core modules of the architecture such as dialog context module 1003 or graph engine 1010 are language independent. As mentioned earlier, the language module alone cannot do much more than analysis of a sentence and performing tasks such a relating a pronoun to its subject/object etc. ("The Led Zeppelin song in the OST of the recent Daniel Craig movie. Who performed it?"), it is ineffective in isolation to associate pronouns across exchanges. It is the interaction with the session dialog context module 1003, that enables resolution of pronouns across exchanges as in the following:

Q1: Who acts as obi-wan Kenobi in the new star wars?
    A1: Ewan McGregor
    Q2: Flow about his movies with Scarlet Johansson While it may seem, at first glance, that dialog session context is a simple state maintenance of the last active entity or entities, the following examples show the lurking complexity in dialog session context:

Q1: Who played the lead roles in Kramner vs. Kramer?
    A1: Meryl Streep and Dustin Hoffman
    Q2: How about more of his movies
    A2: Here are some of Dustin Hoffman movies . . . [list of Dustin Hoffman movies]
    Q3: What about more of her movies?
    A3: [list of movies if any]
    Q4: What about just his early movies?
    A4: [list of movies if any]
    Q5: What about her recent movies?
    A5: [list of movies if any]
    Q6: Have they both acted again in the recent past?
    A6: [list of movies if any]
    Q7: Have they both ever acted again at all?

In the example above, the entities Meryl Streep and Dustin Hoffman are indirectly referred to in six questions, sometimes together and sometimes separately. The above example also illustrates a distinction of embodiments of the present invention from simple request response systems that engage in an exploratory exchange around a central theme. While the present embodiments not only resolve ambiguities in an exchange, they simultaneously facilitate an exploratory exchange with implicit references to entities and/or intents mentioned much earlier in a conversation—something that is naturally done in rich human interactions. In certain embodiments, this is done through the recognition of linguistic linking elements, which are words and/or phrases that link the present user input to a previous user input and/or system response. Referring to the example provided above, the pronouns "his", "hers", and "they" are words that link the present user input to a previous user input and/or system response. Other pronouns, as well as syntactic expletives, can act as linguistic linking elements.

Whether a particular word or phrase used by the user in a later question is a suitable or appropriate link to an entity mentioned in an earlier input (or some other part of the earlier input) is determined by examining the attributes of the earlier entity and the attributes of the potential linking element. For example, "his" is a suitable link to Dustin Hoffman in the example above because Dustin Hoffman is male, and "his" is a male gender pronoun. Moreover, "his" is a possessive pronoun, which is appropriate because the user is referring to movies in which Dustin Hoffman appears.

The following example illustrates user referring to an entity who is not even explicitly specified in a prior exchange (an implicit connection oriented constraint). In other words, the user never identifies the entity that is saved as part of the dialog state.

Q1: Which show had that physically challenged scientist alluding to the possibility of non-carbon based life form?
    A1: That was Stephen Hawking's discovery channel program on aliens.
    Q2: Was he in another show that David Attenborough produced?

In another example of dialog state maintenance not being restricted to just entities and their attributes, the system can maintain state of intents across conversation exchanges, as show as follows:

Q1: "Can my daughter watch pulp fiction with me?"
    A1: Pulp fiction by Quentin Tarantino is rated R for graphic violence and nudity.
    Q2: What about his other movies?
    A2: They are all rated R—Reservoir Dogs, Jackie Brown, Kill Bill, Death Proof In this example in addition to maintain state of the entity "Quentin Tarantino" which enables the system to understand the pronoun reference to him (in the form of "his") Q2, the system also keeps track of user intent across the exchanges—the user intent being the "rating". Again, the system's decision to maintain both "Quentin Taratino" and the "rating" intent stems from the rules and/or Bayes classifier training sets. Thus, the techniques disclosed herein enable the preservation and use of multiple intents. In such an implementation, the set intents would be passed as a collection of intents with weights. Depending on the output of the rules and/or Bayes classifier, the system may elect to save all intents during a session (and/or entities, attributes, etc.), but may only use the one intent that is scored highest for a particular input. Thus, it is possible that an intent that accrued relatively earlier in the dialog exchange applies much later in the conversation. Maintaining the state in this way facilitates a succinct and directed response as in A2, almost matching a human interaction.

The directed responses illustrated above are possible with the intent analyzer 1008 and entity recognizer 1009 working in close concert with the personalization based intent analyzer 1009. These modules are all assisted by an application specific attribute search engine 1011 that assists in determining relevant attributes (e.g., latest, less of violence, more of action) and assigns weights to them. So a user input exchange would come from the speech to text engine 1002, would be processed by the modules, analyzers, and engines working in concert (with the query execution engine 1004 playing a coordinating role), and would yield one or more candidate interpretations of the user input. For instance the question, "Do you have the Kay Kay Menon movie about the Bombay bomb blasts?", the system may have two alternative candidate representations wherein one has "Bombay" as an entity (there is a movie called Bombay) with "bomb blast" being another and the other has "Bombay bomb blast" as a single entity in another. The system then attempts to resolve between these candidate representations by engaging in a dialog with the user, on the basis of the presence of the other recognized entity Kay Kay Menon who is an actor. In such a case, the question(s) to formulate depend on the ambiguity that arises. In this example, the actor entity is known, it is the associated movie entities that are ambiguous. Thus, the system would ask questions concerning the movie entities. The system has a set of forms that are used as a model to form questions to resolve the ambiguities.

In some instances, resolution of ambiguity can be done, without engaging in a dialog, by knowing user's preferences. For instance, the user may ask "Is there a sox game tonight?" While this question has an anibiguous portion the ambiguity of the team being the Boston Red Sox or the Chicago White Sox—if the system is aware that user's preference is Red Sox, then the response can be directed to displaying a Red Sox game schedule if there is one that night. In instances where there are multiple matches across domains, the domain match resulting in the higher overall confidence score will win. Personalization of results can also be done, when applicable, based on the nature of the query. For instance, if the user states "show me movies of Tom Cruise tonight", this query should not apply personalization but just return latest movies of Tom Cruise. However if user states "show me sports tonight", system should apply personalization and display sports and games that are known to be of interest to the user based on his explicit preferences or implicit actions captured from various sources of user activity information.

A user preference signature can be provided by the system using known techniques for discovering and storing such user preference information. For example, the methods and systems set forth in U.S. Pat. No. 7,774,294, entitled Methods and Systems for Selecting and Presenting Content Based on Learned Periodicity of User Content Selections, issued Aug. 10, 2010, U.S. Pat. No. 7,835,998, entitled Methods and Systems for Selecting and Presenting Content on a First System Based on User Preferences Learned on a Second System, issued Nov. 16, 2010, U.S. Pat. No. 7,461,061, entitled User kite: ace Methods and Systems: for Selecting and Presenting Content Based on User Navigation and Selection Actions Associated with the Content, issued Dec. 2, 2008, and U.S. Pat. No. 8,112,454, entitled Methods and Systems for Ordering Content Items According to Learned User Preterences, issued Feb. 7, 2012, each of which is incorporated by reference herein, can be used with the techniques disclosed herein. However, the use of user's preference signatures and/or information is not limited to the techniques set forth in the incorporated applications.

The relationship or connection engine 1010 is one of the modules that plays a role in comprehending user input to offer a directed response. The relationship engine could be implemented in many ways, a graph data structure being one instance so that we may call the relationship engine by the name graph engine. The graph engine evaluates the user input in the backdrop of known weighted connections between entities.

One embodiment showing the importance of the graph engine is illustrated by the following example in which user intent is clearly known. If the user simply queries 'what is the role played by Michelle Pfeiffer in the Tony Montana movie', the system knows the user intent (the word role and its usage in the sentence may be used to deduce that the user wants to know the character that Michelle Pfeiffer has played somewhere) and has to grapple with the fact that the named entity Tony Montana could be the actor named Tony Montana or the name of the leading character of the movie Scarface. The graph engine in this instance is trivially able to disambiguate since a quick analysis of the path between the two Tony Montana entities respectively and the entity of Michelle Pfeiffer quickly reveals that the actor Tony Montana never collaborated with Michelle Pfeiffer, whereas the movie Scarface (about the character Tony Montana) starred Michelle Pfeiffer. Thus, the system will conclude that it can safely ignore the actor Tony Montana and that the user wants to know the name of the character played by Michelle Pfeiffer in the movie Scarface.

In another embodiment, the graph engine 1010 assists when the system is unable to determine the user intent despite the fact that the entity recognizer 1007 has computed the entities specified by the user. This is illustrated by the following examples in which the user intent cannot be inferred or when the confidence score of the user intent is below a threshold. In such a scenario, two illustrative strategies could be taken by a conversation system to get the user's specific intent. In some embodiments, the system determined the most important keywords from the user utterance and treats each result candidate as a document, calculates a relevance score of each document based on the each keyword's relevance, and presents the top few documents to the user for him to peruse. This approach is similar to the web search engines. In other embodiments, the system admits to the user that it cannot process the user request or that the information it gathered is insufficient, thereby prompting the user to provide more information or a subsequent query.

However, neither approach is entirely satisfactory when one considers the response from the user's perspective. The first strategy, which does blind keyword matches, can often look completely mechanical. The second approach attempts to be human-like when it requests the user in a human-like manner to furnish more information to make up for the fact that it could not compute the specific user-intent. However, in the cases that the user clearly specifies one or more other entities related to the desired user intent, the system looks incapable if the system appear to not attempt an answer using the clearly specified entities in the user utterance.

In certain implementations, a third strategy is employed so long as entity recognition has succeeded (even when the specific user intent calculation has failed). Note that entity recognition computation is successful in a large number of cases, especially when the user names or gives very good clues as to the entities in his utterance, which is usually the case.

The strategy is as follows:
1. Consider the entity relationship graph corresponding to the information repository in question. Entities are nodes and relationships are edges in this graph. This mapping involving entities/nodes and relationships/edges can involve one-to-one, one-to-many, and many-to-many mapping based on information and metadata associated with the entities being mapped.
2. Entities/nodes have types from a finite and well-defined set of types.
3. Since entity recognition is successful (e.g., from an earlier interaction), we consider the following cases:
   a. Number of presently recognized entities is 0: In this case, the system gives one from a fixed set of responses based on response templates using the information from the user that is recognized. The template selections is based on rules and/or Bayes classifier determinations.
   b. Number of recognized entities is 1: Suppose that the entity identifier is A and the type of the entity is B and we know the finite set S of all the distinct edge/relationship types A can be involved in. In this case, a system employing the techniques set forth herein ("the IR system") speaks and/or displays a human-consumption multi-modal response template T(A,B,S) that follows from an applicable template response based on A, B and S. The template response is selected from a set of manually constructed template responses based on a priori knowledge of all possible node types and edge types, which form finite well-defined sets. The response and IR system is designed to allow the user to select, using a touch interface or even vocally, more information and entities related to A.
   c. Number of recognized edge types is 2: In this case, let the two entity nodes respectively have identifiers A, A', types B. B' and have edge-type sets 5, 5'.
      If the edge distance between the two entity nodes is greater than some previously decided threshold k, then the IR system appropriately employs and delivers (via speech and/or display) the corresponding two independent human-consumption multi-modal response templates T(A, B, S) and T(A', B', S').
      If the edge distance is no more than k, then the IR system selects a shortest edge length path between A and A'. If there are clues available in user utterance, the IR system may prefer some shortest paths to others. Let there be k' nodes in the selected shortest path denoted $A=A_1, A_2, A_3, \ldots, A_{k'}=A'$ where k'<k+1 and for each i, where i goes from 1 to k', the ith entity node of the path is represented by the 3-tuple $A_i, B_i, E_i$ where $A_i$ is the entity identifier, $B_i$ is the entity type and $E_i$ is a list of one or two elements corresponding to the one or two edges connected to $A_i$ that are present in the selected shortest path. In this case the IR system then delivers to the user an appropriate response based on an intelligent composition of the sequence of human-consumption multi-modal response templates $T(A_i, B_i, E_i)$ where i goes from 1 to k'.
   d. Number of recognized edge types is R>=3: In this case the IR system simply calculates K maximal components $C_1, C_2, \ldots C_k$ where each component $C_i$ is such each entity node A in $C_i$ is at a distance of no more than k edges away from at least one other node A' of $C_i$. For each $C_i$, the IR System selects an appropriate representative sequence of human-consumption multi-modal response template sequences, similar to c. above and composes a response based on the response template sequences for each component.

This method to generate a response is suggested to be more human in that it has the ability to demonstrate to the user that, with the help of the entities recognized, it presented to the user a response which made it potentially easier compared to the two earlier strategies vis-à-vis his goal of retrieving information. FIGS. 7, 6, 9, and 8, illustrate examples implementations of the disclosed techniques.

The techniques set forth above are also used, in certain implementations, to reset all or part of the conversation state values. For example, assume a system has retained certain entities and/or attributes from user input and system responses. When the user provides subsequent input, the techniques disclosed herein enable the new input to be evaluated against the retained values. Speaking in terms of a graph model, if linguistic elements of the subsequent input are found in an entity/relationship graph to be too far removed from the retained information (also in the graph), it can be inferred that the user's subsequent inter has changed from the previous one. In such a case, the earlier retained information can be reset and/or disregarded when performing the subsequent search.

Further still, embodiments of the invention can recognize that a user has provided subsequent input that lacks entities, attributes, or relationship information, but the input is an appropriate response to an earlier system response. For example, a system implementing the techniques set forth herein may present a set of movies as a response to a first user input. The user may then respond that she is not interested in any of the movies presented. In such a case, the system would retain the various conversation state values and make a further attempt to satisfy the user's previous request (by, e.g., requesting additional information about the type of movie desired or requesting additional information to better focus the search, such as actor names, genre, etc.).

In the foregoing description, certain steps or processes can be performed on particular servers or as part of a particular engine. These descriptions are merely illustrative, as the specific steps can be performed on various hardware devices, including, but not limited to, server systems and/or mobile devices. Similarly, the division of where the particular steps are performed can vary, it being understood that no division or a different division is within the scope of the invention. Moreover, the use of "analyzer", "module", "engine", and/or other terms used to describe computer system processing is intended to be interchangeable and to represent logic or circuitry in which the functionality can be executed.

The techniques and systems disclosed herein may be implemented as a computer program product for use with a computer system or computerized electronic device. Such implementations may include a series of computer instructions, or logic, fixed either on a tangible medium, such as a computer readable medium e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques e.g., cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software e.g., a computer program product).

What is claimed is:

1. A computer-implemented method of inferring user intent in a search input, the method comprising:
   receiving a search input from a user at one or more processors, the search input used to identify at least one desired content item of a set of content items, each of the content items being associated with at least one domain;
   determining by the one or more processors that a first portion of the search input contains a linguistic element that has a plurality of possible meanings;
   calculating a first weight based on a distance between a first node of a first graph data structure corresponding to the first portion of the search input and a second node of the first graph data structure corresponding to a second portion of the search input, wherein the first graph data structure comprises nodes connected by relationships, and wherein the first graph data structure is relevant to a first domain;
   calculating a second weight based on a distance between a first node of a second graph data structure corresponding to the first portion of the search input and a second node of the second graph data structure corresponding to the second portion of the search input, wherein the second graph data structure comprises nodes connected by relationships, and wherein the second graph data structure is relevant to a second domain;
   determining by the one or more processors one of the first domain or the second domain as being a relevant domain to the search input based on a comparison of the first weight and the second weight;
   selecting by the one or more processors at least one content item from the set of content items based on the search input, the relevant domain, and metadata associated with the content items; and
   causing to be provided information corresponding to the at least one desired content item.

2. The method of claim 1, the at least one domain including media entertainment and the metadata including at least one of crew, characters, actors, teams, leagues, tournaments, athletes, composers, music artists, performers, albums, songs, news personalities, and content distributors.

3. The method of claim 1, the at least one domain including electronic mail and the metadata including at least one of electronic mail threads, contacts, senders, recipients, company names, business departments, business units, electronic mail folders, and office location information.

4. The method of claim 1, the at least one domain including travel-related information and the metadata including at least one of cities, hotels, hotel brands, individual points of interest, categories of points of interest, retail chains, car rental websites, and car rental company names.

5. The method of claim 1, the at least one domain including electronic commerce and the metadata including at least one of product items, product categories, product subcategories, product brand, and retail stores.

6. The method of claim 1, the at least one domain including network-based documents and the metadata including at least one of domain names, internet media types, filenames, directories, and filename extensions.

7. The method of claim 1, the at least one domain including address book information and the metadata including at least one of contact names, electronic mail address, telephone number, address, and employer.

8. The method of claim 1, further comprising providing a user preference signature, the user preference signature describing preferences of the user for at least one of (i) particular content items and (ii) metadata associated with the content items, wherein the selecting the at least one content item from the set of content items is further based on comparing portions of the search input to the preferences of the user described by the user preference signature.

9. The method of claim 1, further comprising:
   providing a user preference signature, the user preference signature describing preferences of the user for at least one of (i) particular content items and (ii) metadata associated with the content items; and
   ordering the at least one content item based on the preferences of the user described by the user preference signature.

10. The method of claim 1, the metadata associated with the content items including a mapping of relationships between entities associated with the content items, and the determining by the one or more processors the one domain relevant to the search input being based in part on the mapping of relationships and the search input.

11. A system for inferring user intent in a search input, the system comprising:
   a processor configured to:
      receive a search input from a user, the search input used to identify at least one desired content item of a set of content items, each of the content items being associated with at least one domain;
      determine that a first portion of the search input contains a linguistic element that has a plurality of possible meanings;
      calculate a first weight based on a distance between a first node of a first graph data structure corresponding to the first portion of the search input and a second node of the first graph data structure corresponding to a second portion of the search input, wherein the first graph data structure comprises nodes connected by relationships, and wherein the first graph data structure is relevant to a first domain;
      calculate a second weight based on a distance between a first node of a second graph data structure corresponding to the first portion of the search input and a second node of the second graph data structure corresponding to the second portion of the search input, wherein the second graph data structure comprises nodes connected by relationships, and wherein the second graph data structure is relevant to a second domain;

determine one of the first domain or the second domain as being a relevant domain to the search input based on a comparison of the first weight and the second weight;

select at least one content item from the set of content items based on the search input, the relevant domain, and metadata associated with the content items; and causing to be provided information corresponding to the at least one desired content item.

12. The system of claim 11, the at least one domain including media entertainment and the metadata including at least one of crew, characters, actors, teams, leagues, tournaments, athletes, composers, music artists, performers, albums, songs, news personalities, and content distributors.

13. The system of claim 11, the at least one domain including electronic mail and the metadata including at least one of electronic mail threads, contacts, senders, recipients, company names, business departments, business units, electronic mail folders, and office location information.

14. The system of claim 11, the at least one domain including travel-related information and the metadata including at least one of cities, hotels, hotel brands, individual points of interest, categories of points of interest, retail chains, car rental websites, and car rental company names.

15. The system of claim 11, the at least one domain including electronic commerce and the metadata including at least one of product items, product categories, product subcategories, product brand, and retail stores.

16. The system of claim 11, the at least one domain including network-based documents and the metadata including at least one of domain names, internet media types, filenames, directories, and filename extensions.

17. The system of claim 11, the at least one domain including address book information and the metadata including at least one of contact names, electronic mail address, telephone number, address, and employer.

18. The system of claim 11, wherein the processor is further configured to provide a user preference signature, the user preference signature describing preferences of the user for at least one of (i) particular content items and (ii) metadata associated with the content items, wherein the selecting the at least one content item from the set of content items is further based on comparing portions of the search input to the preferences of the user described by the user preference signature.

19. The system of claim 11, wherein the processor is further configured to:

provide a user preference signature, the user preference signature describing preferences of the user for at least one of (i) particular content items and (ii) metadata associated with the content items; and order the at least one content item based on the preferences of the user described by the user preference signature.

20. The system of claim 11, the metadata associated with the content items including a mapping of relationships between entities associated with the content items, and wherein the processor is further configured to determine the one domain relevant to the search input based in part on the mapping of relationships and the search input.

* * * * *